United States Patent Office 3,094,524
Patented June 18, 1963

3,094,524
NOVEL Δ⁴-PREGNENE-3-ONES AND
PREPARATION THEREOF
Daniel Bertin, Montrouge, Hubert Fritel, Paris, and
Lucien Nedelec, Clichy-sous-Bois, France, assignors, by
mesne assignments, to Roussel-UCLAF, S.A., Paris,
France, a corporation of France
No Drawing. Filed July 20, 1961, Ser. No. 125,361
Claims priority, application France Aug. 10, 1960
24 Claims. (Cl. 260—239.55)

The invention relates to novel Δ⁴-pregnene-3-ones having the formula

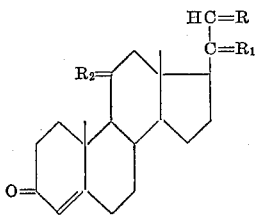

wherein R is selected from the group consisting of

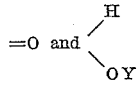

$R_1$ is selected from the group consisting of

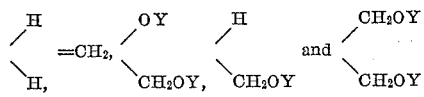

$R_2$ is selected from the group consisting of

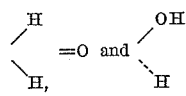

and Y is selected from the group consisting of hydrogen, an acyl radical of a mineral acid and an acyl radical of an organic carboxylic acid having less than 6 carbon atoms. The invention also relates to novel processes for the preparation of said compounds and intermediates thereof.

The compounds of Formula I have a pronounced cardiotropic action accompanied by a dilatory action on coronary blood vessels. They are useful in the treatment of angina of the chest and of coronaritis, in asthma, bronchial spasms and arterial spasms.

It is an object of the invention to provide novel Δ⁴-pregnene-3-ones of Formula I, particularly the following compounds:

(a) 21-acetoxy-20-acetoxymethyl-Δ⁴-pregnene-3, 11-dione (b) 20-nitratomethyl-21-nitrato-Δ⁴-pregnene-3, 11-dione (c) 20-bis-(hydroxymethyl-Δ⁴-pregnene-21-ol-3, 11-dione (d) 20-bis-(nitratomethyl)-21-nitrato-Δ⁴-pregnene-3, 11-dione (e) 20-hydroxymethyl-Δ⁴-pregnene-21-ol-3, 11-dione.

It is another object of the invention to provide novel processes for the preparation of Δ⁴-pregnene-3-ones of Formula I.

It is a further object of the invention to provide novel intermediates for the Δ⁴-pregnene-3-ones of Formula I.

These and other objects and advantages of the invention will become obvious from the following detailed description.

The compounds of the invention have the formula

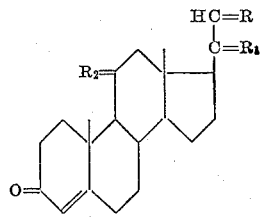

wherein R is selected from the group consisting of

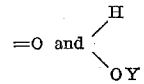

$R_1$ is selected from the group consisting of

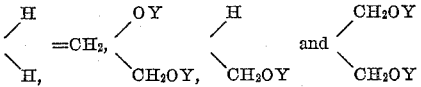

$R_2$ is selected from the group consisting of

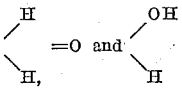

and Y is selected from the group consisting of hydrogen, an acyl radical of a mineral acid and an acyl radical of an organic carboxylic acid having less than 6 carbon atoms.

Examples of suitable organic carboxylic acids having less than 6 carbon atoms are acetic acid, propionic acid, butyric acid, tertiary butyric acid, pentanoic acid and 2, 2-dimethyl propionic acid. Examples of suitable mineral acids are sulfuric and nitric acids.

The compounds of Formula I are prepared from the novel intermediate having the formula

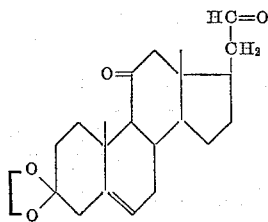

II

The 3-ethylenedioxy-Δ⁵-pregnene-11, 21-dione is prepared by oxidizing 3-ethylenedioxy-Δ⁵,¹⁷⁽²⁰⁾-transpregnadiene-21-ol-11-one to form 3-ethylenedioxy-Δ⁵,¹⁷⁽²⁰⁾-transpregnadiene-11, 21-dione, catalytically hydrogenating the latter to form 3-ethylenedioxy-Δ⁵-pregnene-11, 21-dione and recovering the latter.

A preferred mode of preparing 3-ethylenedioxy-Δ⁵-pregnene-11, 21-dione comprises oxidizing 3-ethylenedioxy-Δ⁵,¹⁷⁽²⁰⁾-transpregnadiene-21-ol-11-one in an inert solvent such as chloroform with manganese dioxide to form 3- ethylene-dioxy-$\Delta^{5,17(20)}$-transpregnadiene-11, 21-dione, hydrogenating the latter under alkaline conditions in a solvent such as tetrahydrofuran and methanol in the presence of palladized carbon black. The reaction scheme is illustrated in Table I.

TABLE I

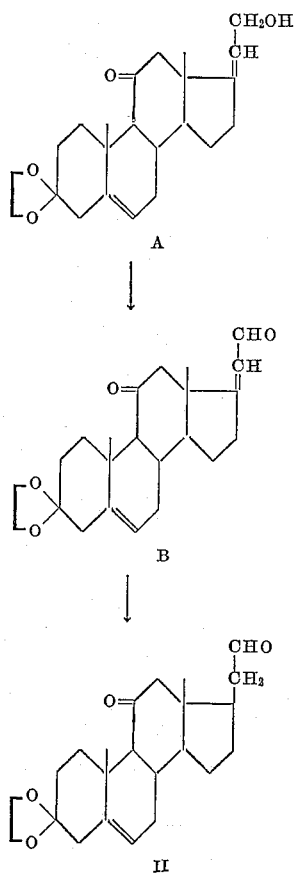

The starting material, 3-ethylenedioxy-$\Delta^{5,17(20)}$-trans-pregnadiene-21-ol 11-one, is prepared from progesterone by bromination of the ethoxyoxalyl derivative followed by reaction with sodium methoxide a process analogous to the process described by Hogg et al., J. Am. Chem. Soc., vol. 77 (1955), p. 4437 and J. Org. Chem., vol. 24 (1959), p. 1600.

The process for the preparation of 20-hydroxymethyl-$\Delta^4$-pregnene-20, 21-diol-3, 11-dione (IA) comprises reacting 3-ethylenedioxy-$\Delta^5$-pregnene-11, 21-dione with formaldehyde to form 3-ethylenedioxy-20-methylene-$\Delta^5$-pregnene-11, 21-dione, reacting the latter with an alkali metal borohydride to form 3-ethylenedioxy-20-methylene-$\Delta^5$-pregnene-21-ol-11-one, reacting the latter under acidic conditions to form 20-methylene-$\Delta^4$-pregnene-21-ol-3, 11-dione, acylating the latter to form 20-methylene-21-acyloxy-$\Delta^4$-pregnene-3, 11-dione, simultaneously hydroxylating and saponifying the said product to form 20-hydroxymethyl-$\Delta^4$-pregnene-20, 21-diol-3, 11-dione and recovering the product.

A preferred mode of the process comprises reacting 3-ethylenedioxy-$\Delta^5$-pregnene-11, 21-dione in a N,N-dialkyl lower alkanoic acid amide such as dimethyl formamide with formaldehyde at a temperature of 40 to 45° C. to form 3-ethylenedioxy-20-methylene-$\Delta^5$-pregnene-11, 21-dione, reacting the latter with sodium borohydride at temperatures of 0 to 5° C. in methanol to form 3-ethylenedioxy-20-methylene-$\Delta^5$-pregnene-21-ol-11-one, reacting the latter with an aqueous acid such as acetic acid, sulfuric acid or hydrochloric acid under hydrolyzing conditions to form 20-methylene-$\Delta^4$-pregnene-21-ol-3, 11-dione, reacting the said product with an acylating agent such as acetic anhydride in pyridine to form 20-methylene-21-acetoxy-$\Delta^4$-pregnene-3, 11-dione, reacting the latter with a hydroxylating agent, such as osmium tetraoxide in pyridine to form 20-hydroxymethyl-$\Delta^4$-pregnene-20, 21-diol-3, 11-dione and recovering the product. Table II illustrates the reaction.

TABLE II

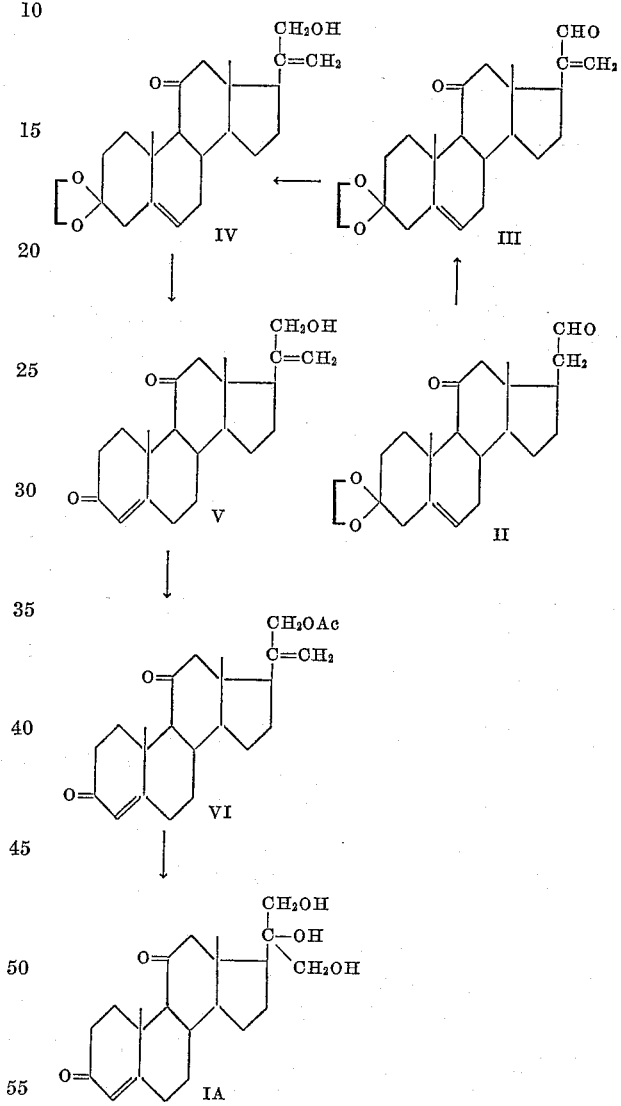

The process for the preparation of 20-methylene-$\Delta^4$-pregnene-3, 11, 21-trione comprises reacting 3-ethylenedioxy-$\Delta^5$-pregnene-11, 21-dione with formaldehyde to form 3-ethylenedioxy-20-methylene-$\Delta^5$-pregnene-11, 21-dione, reacting the latter under acidic conditions to form 20-methylene-$\Delta^4$-pregnene-3, 11, 21-trione and recovering the latter. Table III illustrates the process.

TABLE III

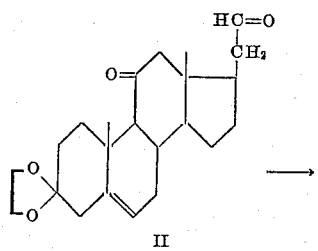

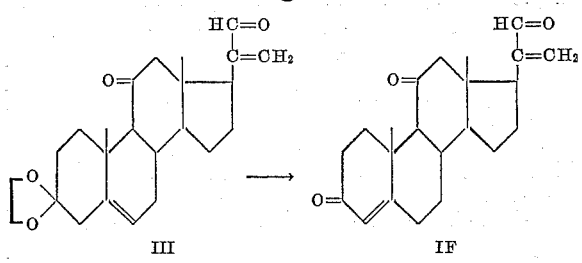

A preferred mode for preparing 20-methylene-Δ⁴-pregnene-3, 11, 21-trione comprises reacting 3-ethylenedioxy-Δ⁵-pregnene-11, 21-dione in a N,N-dialkyl lower alkanoic acid amide such as dimethylformamide with formaldehyde at a temperature of 40 to 45° C. to form 3-ethylenedioxy-20-methylene-Δ⁵-pregnene-11, 21-dione and hydrolyzing the latter with an aqueous acid to form 20-methylene-Δ⁴-pregnene-3, 11, 21-trione and recovering the latter.

The process for the preparation of 20-hydroxymethyl-Δ⁴-pregnene-21-ol-3, 11-dione (IB) and 20-bis-(hydroxymethyl)-Δ⁴-pregnene-21-ol-3, 11-dione (IC) comprises subjecting 3-ethylenedioxy-Δ⁵-pregnene-11, 21-dione to the Tollens reaction to form a mixture of 3-ethylenedioxy-20-hydroxymethyl-Δ⁵-pregnene-21-ol-11-one and 3-ethylenedioxy-20-bis-(hydroxymethyl)-Δ⁵-pregnene-21-ol-11-one, hydrolyzing under acidic conditions to form a mixture of 20-hydroxymethyl-Δ⁴-pregnene-21-ol-3, 11-dione and 20-bis-(hydroxymethyl)-Δ⁴-pregnene-21-ol-3, 11-dione, separating the components of the mixture by chromatography and recovering said products.

A preferred mode of preparing 20-hydroxymethyl-Δ⁴-pregnene-21-ol-3, 11-dione and 20-bis-hydroxymethyl-Δ⁴-pregnene-21-ol-3, 11-dione comprises reacting 3-ethylenedioxy-Δ⁵-pregnene-11, 21-dione with formaldehyde saturated with calcium hydroxide in a N,N-dialkyl lower alkanoic acidamide such as dimethyl formamide at a temperature of about 50° C. to form a mixture of 3-ethylenedioxy-20-hydroxymethyl-Δ⁵-pregnene-21-ol-11-one and 3-ethylenedioxy 20-bis-(hydroxymethyl)-Δ⁵-pregnene 21-ol-11-one, hydrolyzing the mixture with an aqueous acid such as acetic acid, sulfuric acid or hydrochloric acid to form a mixture of 20-hydroxymethyl-Δ⁴-pregnene-21-ol-3, 11-dione and 20-bis-(hydroxymethyl)-Δ⁴-pregnene-21-ol-3, 11-dione, absorbing the mixture on silica gel and selectively eluting the components of the mixture and recovering the said products. The reaction is illustrated in Table IV.

The preparation of Δ⁴-pregnene-3, 11, 21-trione comprises reacting 3-ethylenedioxy-Δ⁵-pregnene-11, 21-dione under acidic conditions to form the desired product and recovering the said trione. The reaction is illustrated in Table V.

TABLE V

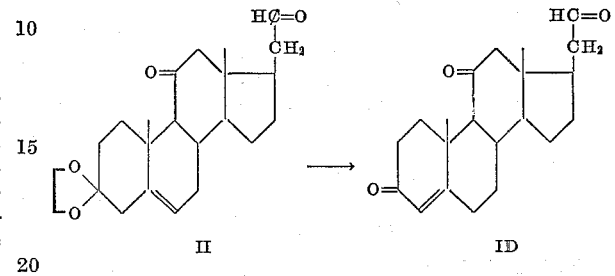

The process for the preparation of Δ⁴-pregnene-21-ol-3, 11-dione comprises reacting 3-ethylenedioxy-Δ⁵-pregnene-11, 2-dione with an alkali metal borohydride to form 3-ethylenedioxy-Δ⁵-pregnene-21-ol-11-one, reacting the latter under acidic conditions to form Δ⁴-pregnene-21-ol-3, 11-dione and recovering the latter.

A preferred process for the preparation of Δ⁴-pregnene-21-ol-3, 11-dione comprises reacting 3-ethylenedioxy-Δ⁵-pregnene-11, 21-dione with sodium borohydride in a lower alkanol such as methanol at low temperatures of about 0° C. to form 3-ethylenedioxy-Δ⁵-pregnene-21-ol-11-one, reacting the latter with an aqueous acid to form Δ⁴-pregnene-21-ol-3, 11-dione and recovering the latter. The reaction scheme is illustrated in Table VI.

TABLE VI

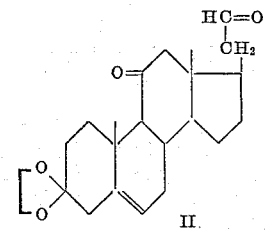

TABLE IV

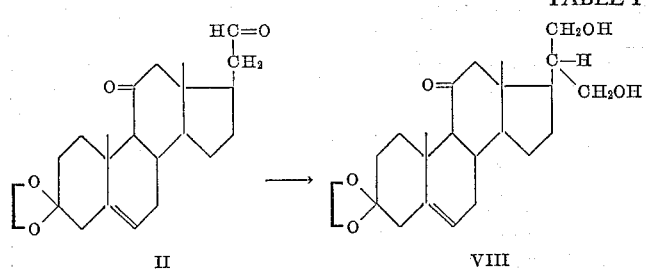

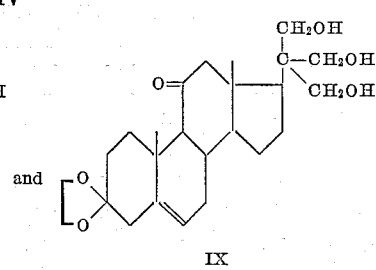

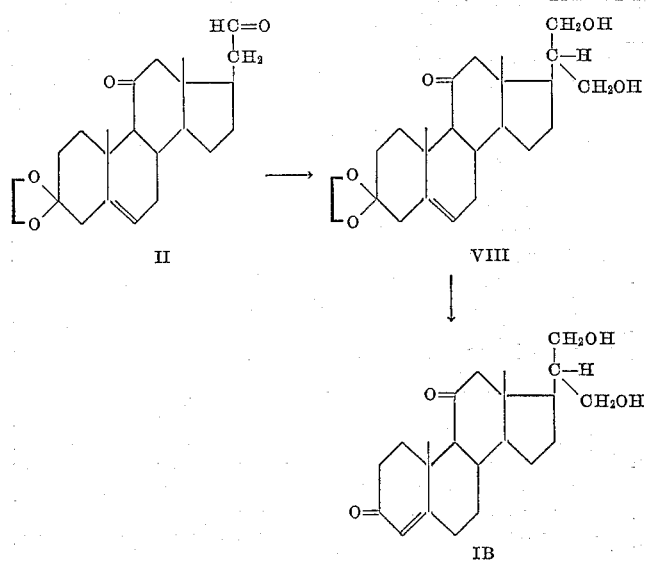

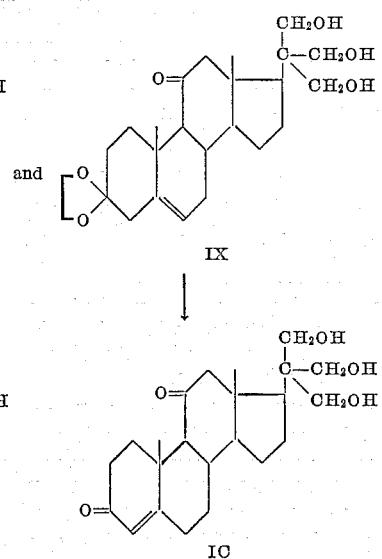

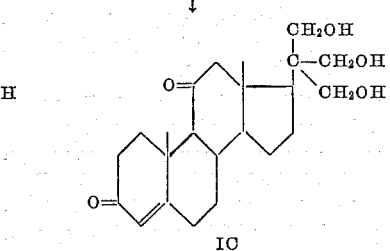

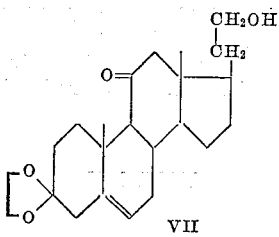

VII

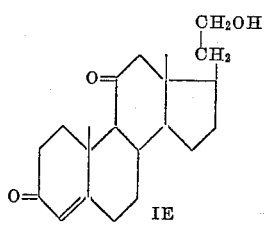

IE

The free alcohols of the compounds of Formula I may be esterified with conventional esterification agents to give the corresponding acylate such as the nitrates and acetates.

The above reactions can be performed using as a starting material a compound having the formula

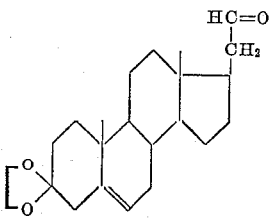

to obtain compounds of Formula I wherein $R_2$ is 

The compounds of the invention may be used in the form of injectable solutions, injectable suspensions, prepared in ampoules, multiple dose flacons, in tablets, emulsions and suppositories. The various pharmaceutical forms can be prepared in the usual manner.

The recommended daily dosages and dosages amounts of some of the compounds of the invention are summarized in Table VII.

TABLE VII

|  | Daily Dosage, mg. | Dosage Amounts, mg. | |
|---|---|---|---|
|  |  | Oral | Injections |
| 21-acetoxy-20-acetoxymethyl-$\Delta^4$-pregnene-3,11-dione. | 5 to 25 | 5 | 2 to 10. |
| 20-nitrato methyl-21-nitrato-$\Delta^4$-pregene-3, 11-dione | 1 to 5 | 1 | 1 to 5. |
| 20-bis-(nitratomethyl)-21-nitrato-$\Delta^4$-pregnene-3, 11-dione. | 0.5 to 2 | 0.5 | 0.5 to 2.5 |
| 20-bis-(hydroxymethyl-$\Delta^4$- pregnene-21-ol-3, 11-dione. | 2 to 10 | 2 | 1 to 5. |
| 20-hydroxymethyl-$\Delta^4$-pregnene 21-ol-3, 11-dione. | 5 to 25 | 5 | 2 to 10. |

In the following examples there are described several preferred embodiments to illustrate the invention. However, it should be understood that the invention is not to be limited to the specific embodiments.

*Example I.—Preparation of 3-Ethylenedioxy-$\Delta^5$-Pregnene-11, 21-Dione (II, in the Form of the Hemiacetal)*

STEP A.—PREPARATION OF 3-ETHYLENEDIOXY-$\Delta^{5,17(20)}$-TRANSPREGNADIENE-11, 21-DIONE (COMPOUND B)

12.8 gm. of 3-ethylenedioxy-$\Delta^{5,17(20)}$-transpregnadiene-21-ol-11-one (Compound A) and 38.5 gm. of manganese dioxide were introduced into 1280 cc. of chloroform. The mixture was agitated for a period of 24 hours at room temperature and filtered. The precipitate was washed several times with chloroform. To the chloroformic solution 0.4 cc. of pyridine were added. The solution was evaporated to dryness under vacuum and the crystalline residue was then taken up in 52 cc. of ethyl acetate. 10 cc. of the solvent were distilled off under vacuum. The solution was cooled to 0° C., and the crystals were vacuum filtered, washed with ethyl acetate and with isopropyl ether and dried. 10.4 gm. of 3-ethylenedioxy-$\Delta^{5,17}{}_{(20)}$-transpregnadiene-11, 21-dione, melting at 236° C., were obtained.

The product was soluble in chloroform, slightly soluble in isopropyl ether and ethyl acetate.

*Analysis.*—$C_{23}H_{30}O_4$; molecular weight=370.47. Calculated: C, 74.56%; H, 8.16%. Found: C, 74.3%; H, 8.1%.

This compound is not described in the literature.

STEP B.—PREPARATION OF 3-ETHYLENEDIOXY-$\Delta^5$-PREGNENE-11,21-DIONE (II, IN THE FORM OF THE HEMIACETAL)

A suspension was prepared starting from 310 cc. of methanol and 2.08 gm. of 10% palladized carbon black. A solution of 10.4 gm. of the compound prepared in step A in 310 cc. of tetrahydrofuran was then added. Next a mixture of 310 cc. of methanol and 5.2 cc. of a 0.1 N-sodium hydroxide solution were added and hydrogen was passed through the reaction mixture. The hydrogenation was terminated and the reaction mixture was filtered, concentrated under vacuum until the start of crystallization. Then 250 cc. of tetrahydrofuran were added and the mixture was evaporated to dryness.

To the frothy residue, 10 cc. of methanol were added and the mixture allowed to remain overnight in the refrigerator. 20 cc. of isopropyl ether were then added, and the crystals were vacuum filtered, washed with iced isopropyl ether and dried under vaccum.

8.3 gm. of 3-ethylenedioxy-$\Delta^5$-pregnene-11,21-dione were obtained (in the form of the methylhemiacetal), melting at 160–170° C. By heating, the hemiacetal lost one molecule of methanol and gave 3-ethylenedioxy-$\Delta^5$-pregnene-11,21-dione in the form of the free aldehyde, melting at 140–142° C.

*Analysis* (free aldehyde). — $C_{23}H_{32}O_4$; molecular weight=372.49. Calculated: C, 74.16%; H, 8.66%. Found: C, 74.2%; H, 8.7%.

*Analysis* (hemiacetal).—$C_{24}H_{36}O_5$; molecular weight= 404.53. Calculated: C, 71.26%; H, 8.97%. Found: C, 71.7%; H, 9.0%.

This compound is not described in the literature.

*Example II.—Preparation of 3-Ethylenedioxy-20-Methylene-$\Delta^5$-Pregnene-11,21-Dione (III)*

*Step A.*—41.5 cc. of a 15% formaldehyde solution were introduced into a solution of 3.32 gm. of 3-ethylenedioxy-$\Delta^5$-pregnene-11,21-dione (in the form of a methyl hemiacetal) in 83 cc. of dimethylformamide under agitation and at room temperature. The temperature rose to 40° C. and 5 cc. of a concentrated potassium hydroxide solution were then added. The temperature was maintained between 40° and 44° C. for a period of 30 minutes. About 42 cc. of water were added and the reaction mixturew as cooled for a period of about 30 minutes at a temperature between 0° and +5° C.

The precipitate formed was vacuum filtered, washed with 25 cc. of iced 50% aqueous dimethylformamide, then with water until the wash waters were neutral and dried at 60° C. for a period of 2 hours.

2.292 gm. of 3-ethylenedioxy-20-methylene-$\Delta^5$-pregnene-11,21-dione were obtained. The product was purified by dissolution at reflux in ethanol with addition of 0.2 cc. of pyridine and by recrystallization on cooling. It had a melting point of 236–237° C.

*Analysis.*—$C_{24}H_{32}O_4$; molecular weight=384.5. Calformed was then vacuum filtered, washed with water until the wash waters were neutral, redissolved in methylene chloride, the solution dried over sodium sulfate, filtered and chromatographed over silica gel.

Elution was made in several extractions by methylene chloride containing 4% acetone. The combined eluates were evaporated to dryness. The raw product obtained was dissolved in methylene chloride, and the solution filtered and evaporated to dryness under nitrogen. The residue was dissolved in hot ethanol, crystallized in the cold, triturated with cold ethanol and dried. 18.5 mg. of 20-nitratomethyl-21-nitrato-$\Delta^4$-pregnene-20-ol-3,11-dione were obtained having a melting point of 162° C. then 176–178° C.

The product was soluble in alcohol and chloroform, insoluble in water and dilute aqueous acids.

This compound is not described in the literature.

STEP F.—PREPARATION OF 20-ACETOXYMETHYL-21-ACETOXY-$\Delta^4$-PREGNENE-20-OL-3,11-DIONE 120 mg. of the compound prepared in step D were dissolved in 1 cc. of anhydrous pyridine and 0.5 cc. of acetic acid anhydride was then added. The reaction mixture was allowed to stand at room temperature for a period of about 2 hours and then was poured into 20 cc. of ice water. The gummy precipitate formed was extracted with methylene chloride. The extracts were washed with a normal solution of hydrochloric acid, then with water until the wash waters were neutral. The extract was dried over magnesium sulfate and evaporated to dryness. The residue was dissolved in methylene chloride and chromatographed.

The elutions were made with several extractions with methylene chloride having 3 and 4% acetone. The eluates were combined, filtered and evaporated to dryness. The residue was dissolved in methylene chloride. Ether was added to the solution and the mixture was subjected to distillation in order to eliminate methylene chloride. This caused an abundant crystallization. The reaction mixture was iced, vacuum filtered and the crystals washed with ether. 68 mg. of 20-acetoxymethyl-21-acetoxy-$\Delta^4$-pregnene-20-ol-3,11-dione were obtained having a melting point of 195–198° C.

The product was soluble in alcohol, acetone and chloroform, slightly soluble in benzene, very slightly soluble in ether, insoluble in water.

*Analysis.*—$C_{26}H_{36}O_7$: molecular weight=460.55. Calculated: C, 67.8%; H, 7.88%. Found: C, 67.5%; H, 8.1%.

This compound is not described in the literature.

*Example IV.*—*Preparation of 20-Hydroxymethyl-$\Delta^4$-Pregnene-21-Ol-3,11-Dione (IB) and Its Esters Such as the 20,21-Dinitrate and the 20,21-Diacetate*

STEP A.—PREPARATION OF 20-HYDROXYMETHYL-$\Delta^4$-PREGNENE-21-OL-3,11-DIONE (IB)

A solution of 2 gm. of 3-ethylenedioxy-$\Delta^5$-pregnene-11,21-dione in 90 cc. of dimethylformamide and 25 cc. of water was prepared. Then 30 cc. of 30% formaldehyde solution saturated with calcium hydroxide were added rapidly under agitation and at a temperature of 50° C. Thereafter, 0.5 gm. of calcium hydroxide was added. The agitation was continued for a period of 4 hours in all while maintaining the reaction medium alkaline by the addition of calcium oxide. Finally, the temperature of the reaction mixture was increased progressively about 5° C. per hour of agitation so that at the fourth hour, a temperature of 70° C. was attained.

At the end of the reaction, the recreation mixture was cooled to +10° C. and 60 cc. of a normal solution of hydrochloric acid were added in such a manner as to obtain a pH of 4 to 5. The residue formed was filtered. The residue which was separated by filtration was 20-hydroxymethyl-$\Delta^4$-pregnene-21-ol-3,11-dione. The filter cake was washed with water and the filtrates were combined, acidified by the addition of hydrochloric acid to a pH of 1, then maintained for a period of 1 hour under nitrogen at 45° C. The reaction mixture was cooled and extracted several times with methylene chloride or chloroform.

The organic phases were combined, washed successively with water, with a 10% solution of sodium carbonate and again with water. The wash waters were re-extracted by the same solvent which was then added to the combined extracts. Finally, the extracts were dried over magnesium sulfate and evaporated to dryness. The residue was dissolved in 15 cc. of methylene chloride and subjected to chromatography over silica gel. After an elution with methylene chloride containing 3.5% of methanol, 0.350 gm. of 20-hydroxymethyl-$\Delta^4$-pregnene-21-ol-3,11-dione were obtained. The raw product was triturated at room temperature with ethyl acetate, then recrystallized from ethanol. The product had a melting point of 196–198° C. and a specific rotation $[\alpha]_D^{20}=+157.8°$ (c=0.43% in ethanol).

The product was soluble in chloroform and alcohol, slightly soluble in ethyl acetate.

*Analysis.*—$C_{22}H_{32}O_4$; molecular weight=360.48. Calculated: C, 73.29%; H, 8.95%. Found: C, 73.2%; H, 9.1%.

This compound is not described in the literature.

STEP B.—PREPARATION OF 21-ACETOXY-20-ACETOXY-METHYL-$\Delta^4$-PREGNENE-3,11-DIONE 0.170 gm. of the compound prepared in step A were placed in suspension in a mixture of 1 cc. of pyridine and 0.5 cc. of acetic acid and agitated. After solution, the reaction mixture was allowed to stand at rest under nitrogen for a period of 2 hours and then poured on ice and mixed for another hour. The crystalline precipitate formed was vacuum filtered, washed with water and dried. 0.192 gm. of 21-acetoxy-20-acetoxymethyl-$\Delta^4$-pregnene-3,11-dione were obtained. The product could be recrystallized from aqueous ethanol. It had a melting point of 137–138° C. and a specific rotation $$[\alpha]_D^{20}=+126.5°$$

(c=0.616% in ethanol).

The product was soluble in ethyl acetate, acetone, benzene and chloroform, moderately soluble in alcohol, slightly soluble in isopropyl ether.

*Analysis.*—$C_{26}H_{36}O_6$; molecular weight=444.55. Calculated: C, 70.24%; H, 8.16. Found: C, 70.5%; H, 8.2%.

This compound is not described in the literature.

STEP C.—PREPARATION OF 21-NITRATO-20-NITRATO-METHYL-$\Delta^4$-PREGNENE-3,11-DIONE 1 cc. of fuming nitric acid was introduced slowly into 3 cc. of acetic acid anhydride cooled to −15° C. Then 150 mg. of the compound prepared in step A were added slowly under agitation and under nitrogen at −15° C. The agitation was continued for a period of 20 minutes while increasing the temperature in the following manner:

5 minutes at −15° C.
10 minutes at −10° C.
5 minutes at −5° C.

The mixture was poured on ice and when the temperature had mounted to between 0 and +5° C., the precipitate obtained was vacuum filtered and washed with water until the wash waters were neutral. 176 mg. of 20-nitratomethyl-21-nitrato-$\Delta^4$-pregnene-3, 11-dione having a melting point of 190–192° C. and a specific rotation $$[\alpha]_D^{20}=+135°$$

(c=0.5% in chloroform) were obtained.

The product could be purified by dissolution in refluxing ethanol and crystallization by cooling. It was soluble in acetone, benzene and chloroform, insoluble in ether.

*Analysis.*—$C_{22}H_{30}O_8N_2$; molecular weight =450.48.

culated: C, 74.96%; H, 8.39%. Found: C, 74.7%; H, 8.4.

The product is soluble in acetone, benzene and chloroform, slightly soluble in alcohol.

This compound is not described in the literature.

*Step B.*—350 mg. of 3-ethylenedioxy-20-methylene-$\Delta^5$-pregnene-11,21-dione were placed in suspension in 5.3 cc. of acetic acid and 2.6 cc. of water. The mixture was heated to about 30° C. and 0.2 cc. of concentrated hydrochloric acid were added in order to bring the pH value to about 1.

The reaction mixture was heated to 45–50° C. under nitrogen and under agitation and maintained at this temperature for a period of 1 hour. Then the solution was cooled to about 30 C. 7.8 cc. of water were added in small amounts and the mixture was cooled to 0° C. The precipitate obtained was vacuum filtered, washed with dilute aqueous acid, then with water until the wash waters were neutral and dried at 60–80° C.

260 mg. of 20-methylene-$\Delta^4$-pregnene-3,11,21-trione (IF) were obtained having a melting point of 178–179° C. and a specific rotation $[\alpha]_D^{20} = +204°$ (c=0.46% in chloroform).

The product was soluble in benzene, 50% acetic acid, benzene-isopropyl ether mixtures, insoluble in water, ether and isopropyl ether.

*Analysis.*—$C_{22}H_{28}O_3$; molecular weight=340.44. Calculated: C, 77.61%; H, 8.29%. Found: C, 77.7%; H, 8.4.

This compound is not described in the literature.

*Example III. — Preparation of 20-Hydroxymethyl-$\Delta^4$-Pregnene-20,21-Diol-3,11-Dione (IA) and its Esters*

STEP A.—PREPARATION OF 3-ETHYLENEDIOXY-20-METHYLENE-$\Delta^5$-PREGNENE-21-OL-11-ONE (IV)

3.7 gm. of 3-ethylenedioxy-20-methylene-$\Delta^5$-pregnene-11,21-dione prepared in step A of Example I were placed in suspension in 740 cc. of methanol. The suspension was cooled under agitation to a temperature between about 0° and +5° C. and 740 mg. of sodium borohydride were introduced. The mixture was agitated for a period of one hour while maintaining the same temperature. Then the pH value was brought to between 7 and 8 by the addition of acetic acid. The mixture was concentrated under vacuum and the volume of reaction mixture was brought to 30 cc. A precipitate was obtained on which 740 cc. of ice water were poured. The precipitate was iced, then vacuum filtered and washed with water until the wash water were neutral and dried. The solvated product as desolvated by dissolution in 70 cc. of methylene chloride having 0.2 cc. of pyridine, drying over magnesium sulfate, filtering and evaporating to dryness under atmospheric pressure.

3.5 gm. of 3-ethylenedioxy-20-methylene-$\Delta^5$-pregnene-21-ol-11-one were obtained which, upon recrystallization from 80% ethanol, had a melting point of 203° C.

The product was soluble in alcohol, acetone and benzene, insoluble in water and ether.

*Analysis.*—$C_{24}H_{34}O_4$; molecular weight=386.52. Calculated: C, 74.57%; H, 8.87%. Found: C, 74.5; H, 8.9.

This compound is not described in the literature.

STEP B.—PREPARATION OF 20-METHYLENE-$\Delta^4$-PREGNENE-21-OL-3, 11-DIONE (V)

206 mg. of the compound prepared in step A were introduced into a mixture of 4.1 cc. of methanol and 0.2 cc. of a normal solution of sulfuric acid and the reaction mixture was heated to reflux for a period of 30 minutes. It was cooled and 31 cc. of water were added. The precipitate obtained was vacuum filtered, washed with water until the wash waters were neutral and dried. 160 mg. of 20 - methylene-$\Delta^4$-pregnene-21-ol-3,11-dione were obtained melting at 150° C. The product could be recrystallized from aqueous acetone.

The product was soluble in alcohol, acetone and benzene, insoluble in water.

*Analysis.*—$C_{22}H_{30}O_3$; molecular weight=342.46. Calculated: C, 77.14%; H, 8.83%. Found: C, 77.0%; H, 8.9%.

This compound is not described in the literature.

STEP C.—PREPARATION OF 20-METHYLENE-21-ACETOXY-$\Delta^4$-PREGNENE-3,11-DIONE (VI)

200 mg. of the compound prepared in step B were introduced into 0.8 cc. of pyridine and 0.4 cc. of acetic anhydride. The reaction mixture was allowed to remain for a period of 2 hours at room temperature, then poured into 28 cc. of water and agitated for a period of one hour. The precipitate was vacuum filtered, washed with water until the wash waters were neutral and dried. The raw product was purified by dissolution at elevated temperatures in isopropyl ether and crystallization. 162 mg. of 20-methylene-21-acetoxy-$\Delta^4$-pregnene-3,11-dione having a melting point of 106° C., then 156° C., were obtained.

The product was soluble in alcohol and acetone, slightly soluble in ether and isopropyl ether, insoluble in water.

*Analysis.*—$C_{24}H_{32}O_4$; molecular weight=384.50. Calculated: C, 74.96%; H, 8.39%. Found: C, 74.8%; H, 8.4%.

This compound is not described in the literature.

STEP D.—PREPARATION OF 20-HYDROXYMETHYL-$\Delta^4$-PREGNENE-20,21-DIOL-3,11-DIONE (IA)

A mixture of 58 mg. of osmium tetraoxide, 0.1 cc. of pyridine and 1.5 cc. of anhydrous ether was introduced under agitation and under nitrogen into a solution of 80 mg. of the compound prepared in step C in a mixture of 3 cc. of anhydrous ether and 0.2 cc. of pyridine. The agitation was maintained for a period of 45 minutes at room temperature. Then the ether was evaporated and the residue was taken up in 4 cc. of ethanol. A solution of 400 mg. of sodium sulfite in 2 cc. of water was added and the reaction mixture was heated to reflux for a period of 5 hours.

The reaction mixture was cooled and filtered, and the filter cake was washed with ethanol. The filtrate and ethanol wash liquors were concentrated under vacuum. To the residue from the distillation were added 2.5 cc. of ethanol and 0.3 cc. of normal sodium hydroxide and the solution was allowed to remain under nitrogen at room temperature for a period of 1½ hours. The reaction mixture was neutralized by the addition of acetic acid, added to water and extracted with chloroform containing 20% butanol in several extractions. The organic extracts were combined, washed with a dilute solution of sodium bicarbonate, then with water, dried over magnesium sulfate and evaporated to dryness under vacuum.

The residue obtained was added to isopropyl ether, then purified by a chromatography through magnesium silicate with elution with methylene chloride containing 6% methanol. This gave after evaporation of the solvent a colorless oil crystallizable by the addition of methanol. 20-hydroxymethyl-$\Delta^4$-pregnene-20,21-diol-3,11-dione was obtained with a yield of 50%. The product upon recrystallization from butanol, had a melting point of 205° C. then 215° C.

The product was soluble in alcohol and butanol, slightly soluble in acetone and chloroform, insoluble in water, ether and benzene.

*Analysis.*—$C_{22}H_{32}O_5$; molecular weight=276.48. Calculated: C, 70.18%; H, 8,57%. Found: C, 70.0%; H, 8.6%.

This compound is not described in the literature.

STEP E.—PREPARATION OF 20-NITRATOMETHYL-21-NITRATO-$\Delta^4$-PREGNENE-20-OL-3,11-DIONE 67 mg. of the comopund prepared in step D were dissolved under agitation and under nitrogen in a mixture of 3 cc. of acetic anhydride and 1 cc. of fuming nitric acid which was prepared immediately before use and cooled to −20° C. The temperature of the mixture was allowed to mount to about −5° C. and the mixture was poured into a mixture of water and ice. The precipitate Calculated: C, 58.65%; H, 6.71%. Found: C, 58.5%; H, 6.8%.

This compound is not described in the literature.

*EXAMPLE V.—Preparation of 20-Bis-(Hydroxymethyl)-$\Delta^4$-Pregnene-21-Ol-3, 11-Dione (IC) and its 21-Nitrato-20, 20-Bis-Nitratomethyl Ester*

STEP A.—PREPARATION OF 20-BIS-(HYDROXYMETHYL)-$\Delta^4$-PREGNENE-21-OL-3,11-DIONE (IC)

In Example IV, step A, there was described the process of preparation of 20-hydroxymethyl-$\Delta^4$- pregnene-21-ol-3, 11-dione which was separated from other products by chromatography over silica gel with an elution of methylene chloride containing 3.5% of methanol. However, a new elution with methylene chloride containing 6% of methanol gave the isolation of 0.160 gm. of 20-bis-(hydroxymethyl)-$\Delta^4$-pregnene-21-ol-3, 11-dione. This product was purified by solution at elevated temperatures in normal butanol accompanied by repeated recrystallizations.

The product had a melting point of 244–246° C. and a specific rotatoin $[\alpha]_D^{20}=+130.4°$ (c=0.49% in ethanol).

It was moderately soluble in alcohol, slightly soluble in hot water, slightly soluble in chloroform, insoluble in isopropyl ether and benzene.

*Analysis.*—$C_{23}H_{34}O_5$: molecular weight=390.50. Calculated: C, 70.74%; H, 8.78%. Found: C, 71.0%; H, 9.1%.

This compound is not described in the literature.

STEP B.—PREPARATION OF 21-NITRATO-20-BIS-(NITRATOMETHYL)-$\Delta^4$-PREGNENE-3,11-DIONE 0.5 cc. of fuming nitric acid was introduced slowly into 1.5 cc. of acetic acid anhydride cooled to −15° C. under agitation and under nitrogen. Then over a period of about one minute, 60 mg. of 20-bis-(hydroxymethyl)$\Delta^4$-pregnene-21-ol-3, 11-dione were added at a temperature of the order of −10° C. The reaction was allowed to stand continually under agitation at a temperature of −10° C. for a period of about 20 minutes. The reaction mixture was poured over ice and the gummy precipitate was extracted twice with methylene chloride.

The organic extracts were combined, washed successively with water, with a solution of 10% sodium bicarbonate, and again with water, dried over magnesium sulfate and evaporated to dryness. The resinous residue obtained was crystallized by the addition of ethanol. The raw product was purified by solution at elevated temperatures in ethanol and crystallization at lower temperatures. 60 mg. of 20-bis-(nitratomethyl)-21-nitrato-$\Delta^4$-pregnene-3, 11-dione having a melting point of 180–182° C. were obtained.

It was soluble in acetone, benzene and chloroform, slightly soluble in alcohol, insoluble in water.

*Analysis.*—$C_{23}H_{31}O_{11}N_3$; molecular weight =525.50. Calculated: C, 52.57%; H, 5.94%. Found: C, 52.8%; H, 6.1%.

This compound is not described in the literature.

*EXAMPLE VI.—Preparation of $\Delta^4$-Pregnene-3,11,21-Trione (ID)*

0.27 gm. of 3-ethylene-dioxy-$\Delta^5$-pregnene-11, 21-dione were dissolved in a solution of 2.7 cc. of acetic acid, 1.35 cc. of water and 0.1 cc. of concentrated hydrochloric acid. The reaction mixture was heated under nitrogen for a period of one hour at a temperature of 45° C. Then, 5 cc. of water were added. The crystalline precipitate was vacuum filtered, washed with water until the wash waters were neutral and dried. 0.170 gm. of $\Delta^4$-pregnene-3,11,21-trione were obtained. The mother liquor gave a second batch of the product weighing 0.033 gm., being a total yield of 93%. The raw product was purified by crystallization from benzene with the addition of isopropyl ether. The product had a melting point of 150–151° C. and a specific rotation $[\alpha]_D^{20}=+193°$ (c=0.48% in chloroform).

It was soluble in acetone, benzene, chloroform and alcohol, slightly soluble in ether.

*Analysis.*—$C_{21}H_{28}O_3$; molecular weight=328.43. Calculated: C, 76.79%; H, 8.59. Found: C,76.8%; H, 8.6%.

This compound is not described in the literature.

*Example VII.—Preparation of $\Delta^4$-Pregnene-21-Ol-3, 11-Dione (IE)*

STEP A.—PREPARATION OF 3-ETHYLENEDIOXY-$\Delta^5$-PREGNENE-21-OL-11-ONE (VII)

0.5 gm. of 3-ethylenedioxy-$\Delta^5$-pregnene-11,21-dione were introduced into 15 cc. of methanol. The reaction mixture was cooled to a temperature between 0° and +3° C. and 0.1 gm. of sodium borohydride were added under agitation and an atmosphere of nitrogen. The reaction mixture was maintained at the same temperature for a period of about 45 minutes. Then, 0.1 cc. of acetic acid were added and the solution was brought to a pH value of 7.5 to 8 by addition of a sodium bicarbonate solution.

The methanol was evaporated under vacuum until the start of crystallization. The solution was iced and vacuum filtered. The crystalline residue was washed with water. 0.444 gm. of 3-ethylenedioxy-$\Delta^5$-pregnene-21-ol-11-one were obtained being a yield of 96% and having a melting point of 162–164° C.

The product was soluble in alcohol, insoluble in water and dilute alkalis, decomposed in dilute aqueous acids.

This compound is not described in the literature.

3-ethylenedioxy-$\Delta^5$-pregnene-21-ol-11-one was also obtained by direct hydrogenation of 3-ethylenedioxy-$\Delta^{5,17(20)}$-transpregnadiene-21-ol-11-one under operating conditions identical to those described in step B of Example I.

STEP B.—PREPARATION OF $\Delta^4$-PREGNENE-21-OL-3, 11-DIONE (IE)

0.4 gm. of the compound produced in step A were introduced into a mixture of 4.8 cc. of acetone, 1.2 cc. of water and 0.25 cc. of a solution of normal hydrochloric acid. The reaction mixture was heated under nitrogen to 40° C. and maintained at this temperature for a period of 1 hour. The acetone was evaporated under vacuum and the crystalline residue obtained was vacuum filtered, washed with water and dried. The raw product was purified by solution in ethanol, filtration, addition of water and crystallization in the cold. 0.265 gm. of $\Delta^4$-pregnene-21-ol-3,11-dione having a melting point of 145° C., then 154° C. and a specific rotation $[\alpha]_D^{20}=+181°$ (c=0.55% in ethanol) were obtained.

The product was soluble in alcohol, benzene, chloroform and ethyl acetate, insoluble in water.

*Analysis.*—$C_{21}H_{30}O_3$; molecular weight=330.45. Calculated: C, 76.32%; H, 9.15%. Found: C, 76.3%; H, 9.2%.

This compound is not described in the literature.

The 11$\beta$-hydroxy free alcohol or organic acylated compounds of Formula I may be prepared by reduction of the corresponding 11-one free alcohol compounds with lithium aluminium hydride in tetrahydrofuran to form the corresponding 3,11$\beta$-diol compounds and by subsequent oxidation of the latter with manganese dioxide in chloroform to form the desired corresponding 11$\beta$-ol 3-one compounds which may be acylated with an organic acid as described above.

*Example VIII.—Preparation of 20-Hydroxymethyl-$\Delta^4$-Pregnene-11$\beta$,20,21-Triol-3-One*

Into 30 cc. of tetrahydrofuran there were introduced 800 mg. of lithium aluminium hydride while maintaining the temperature at 18° C., by a water-ice bath. Then, over fifteen minutes at the same temperature, the following solution was added:

50 cc. of tetrahydrofuran
800 mg. of 20-hydroxymethyl-Δ⁴-pregnene-20,21-diol-3,11-dione (IA).

Then another 15 cc. of tetrahydrofuran were added and the reaction mixture was agitated for four hours at room temperature under nitrogen. The excess lithium aluminium hydride was destroyed by the addition of 16 cc. of ethyl acetate. About 18 cc. of a saturated solution of sodium chloride diluted in half was then introduced under agitation. The mineral precipitate formed was separated from the organic phase, then extracted with ethyl acetate. The organic solutions were combined and then washed with a saturated solution of sodium chloride diluted in half, dried over sodium sulfate and evaporated under vacuum.

The resin obtained was dissolved in ethanol. The solution was filtered and concentrated and the resin was precipitated from the hot solution by the addition of water. The precipitate was then vacuum filtered, washed with iced aqueous alcohol and dried at 80° C. 480 mg. of 20-hydroxymethyl-Δ⁴-pregnene-3,11β,20,21-tetrol were obtained being a yield of 60%.

400 mg. of 20-hydroxymethyl-Δ⁴-pregnene-3,11β,20,21-tetrol and 1200 mg. of manganese dioxide were introduced in 400 cc. of chloroform. The mixture was agitated for a period of 24 hours at room temperature and filtered. The precipitate was washed several times with chloroform. To the chloroformic solution, 0.13 cc. of pyridine were added. The solution was evaporated to dryness under vacuum and the crystalline residue was then taken up in ethyl acetate. The crystals were vacuum filtered, washed with ethyl acetate and dried. 320 mg. of 20-hydroxymethyl-Δ⁴-pregnene - 11β,20,21 - triol-3-one were obtained, being a yield of 80%.

The mineral acid esters of the 11β-hydroxylated compounds of Formula I may be prepared in the same manner by starting from the mineral acid esters of the corresponding 11-one compounds of Formula I.

The 11β-hydroxylated compounds corresponding to the 11-one compounds of Formulae ID and IF may also be prepared in the same manner by starting from 3-ethylene dioxy-Δ⁵,¹⁷⁽²⁰⁾-transpregnadiene - 21 - ol - 11-one which is reduced with lithium-aluminium hydride in tetrahydrofuran to form the corresponding 11β-hydroxy compound. The compound thus obtained is oxidized with manganese dioxide in chloroform to form the corresponding 11β-ol-21-one compound. The subsequent stages are the same as described in Example II or in Example VI.

PHARMACOLOGICAL STUDY—ACTION ON CORONARY BLOOD FLOW

The study of the action of the various compounds listed in Table VII was made on coronary blood flow on the isolated rabbit heart utilizing the technique inspired from Langendorff (Arch. gesam. Physiol. 61, 291 (1895). In this method the heart was suspended by the aorta to a tube and the coronary system was perfused by means of this tube under a constant pressure of 5 cm. of mercury, by the Locke serum at a pH of 7.2 to 7.3, heated to 37° C. The compound studied was placed in solution in ethanol and this solution was diluted by means of Locke serum to a convenient concentration.

In an adequate registering apparatus, the coronary blood flow was registered and parallelly the ventricular contractions.

The threshold concentration of the compounds which clearly increases the coronary blood flow of one such preparation was determined and the attached table furnishes the results obtained with the compounds as well as with trinitrine and papaverine under the same experimental conditions.

TABLE IX

| Compounds studied | Liminal active concentration in μg./cc. in the perfusion liquid | Increase in coronary blood flow in percent of normal flow | Duration of action in minutes | Action upon the ventricular contractions | |
|---|---|---|---|---|---|
| | | | | On amplitude, percent | On frequency, percent |
| Trinitrine | 1 | 10 | 2-20 | 0 | -5 |
| Papaverine | 10 | 20 | 15 | 0 | 0 |
| 21-Acetoxy-20-acetoxymethyl-Δ⁴-pregnene-3, 11-dione | 0.01-0.05 | 20 | 30 | 0 | 0 |
| 20-nitratomethyl-21-nitrato-Δ⁴-pregnene-3, 11-dione | 0.001 | 30 | >20 | 0 | 0 |
| 20-bis-(hydroxymethyl)-Δ⁴-pregnene-21-ol-3, 11-dione | 0.001-0.01 | 50 | >20 | 0 | 0 |
| 21-nitrato, 20-bis-(nitrato-methyl)-Δ⁴-pregnene-3, 11-dione | 0.0005-0.001 | 40 | 25 | 0 | 15 |
| 20-hydroxymethyl-Δ⁴-pregnene-21-ol-3, 11-dione | 0.01 | 30 | >20 | 0 | 0 |

ACUTE TOXICITY

Toxicity tests were made on mice of the Rockland strain weighing between 18 and 22 gm. The compound to be used was placed in suspension at 5 or 10 mg. per cc. in an adequate dispersing solute. It was injected in this form by subcutaneous method into one group or two groups of ten mice in various doses. The animals were held under observation for a period of a week. No symptoms of intoxication nor mortality were noted in the course of this period. 20-acetoxymethyl-21-acetoxy-Δ⁴-pregnene-3, 11-dione and 20-nitratomethyl-21-nitrato-Δ⁴-pregnene-3, 11-dione were devoid of toxicity even in doses of 100 mg./kg. and 50 mg./kg. respectively. 20-hydroxymethyl-Δ⁴-pregnene-21-ol-3, 11-dione was devoid of toxicity at a dosage of 50 mg./kg.

Various modifications of the processes of the invention may be made without departing from the spirit or scope thereof, and it is to be understood that the invention be limited only as defined in the appended claims.

We claim:
1. A compound having the formula

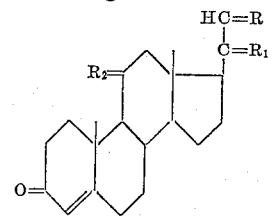

wherein R is selected from the group consisting of

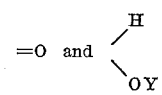

$R_1$ is selected from the group consisting of

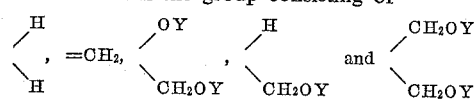

$R_2$ is selected from the group consisting of

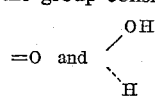

and Y is selected from the group consisting of hydrogen and an acyl radical of a mineral acid and an acyl radical of an organic carboxylic acid having less than 6 carbon atoms.

2. 20-hydroxymethyl-Δ⁴-pregnene-20, 21-diol-3, 11-dione.

3. 20-nitratomethyl-21-nitrato-Δ⁴-pregnene-20-ol-3, 11-dione.

4. 20-acetoxymethyl - 21 - acetoxy-Δ⁴-pregnene-20-ol-3, 11-dione.

5. 20-hydroxymethyl-Δ⁴-pregnene-21-ol-3, 11-dione.

6. 20-acetoxymethyl-21-acetoxy-Δ⁴-pregnene-3, 11-dione.

7. 20-nitratomethyl-21-nitrato-Δ⁴-pregnene-3, 11-dione.

8. 20-bis-(hydroxymethyl)-Δ⁴-pregnene-21-ol-3, 11-dione.

9. 20-bis-(nitratomethyl)-21-nitrato-Δ⁴-pregnene-3, 11-dione.

10. Δ⁴-pregnene-21-ol-3, 11-dione.

11. 21-nitrato-Δ⁴-pregnene-3, 11-dione.

12. Δ⁴-pregnene-3, 11, 21-trione.

13. 20-methylene-Δ⁴-pregnene-3, 11, 21-trione.

14. 3-ethylenedioxy-Δ⁵,¹⁷⁽²⁰⁾-transpregnadiene-11, 21-dione.

15. 3-ethylenedioxy - 20 - hydroxymethyl-Δ⁵-pregnene-21-ol-11-one.

16. 3 - ethylenedioxy - 20 - bis - (hydroxymethyl) - Δ⁵-pregnene-21-ol-11-one.

17. A process for the preparation of 3-ethylenedioxy-Δ⁵-pregnene-11, 21-dione which comprises oxidizing 3-ethylenedioxy - Δ⁵,¹⁷⁽²⁰⁾ - transpregnadiene - 21 - ol - 11-one to form 3-ethylenedioxy-Δ⁵,¹⁷⁽²⁰⁾-transpregnadiene-11, 21-dione, catalytically hydrogenating the latter to form 3-ethylenedioxy-Δ⁵-pregnene-11, 21-dione and recovering said product.

18. The process of claim 17 wherein the oxidation is effected in the presence of manganese dioxide.

19. The process of claim 17 wherein the hydrogenation is effected in the presence of palladized carbon black.

20. A process for the preparation of 20-hydroxymethyl-Δ⁴-pregnene-20, 21-diol-3, 11-dione which comprises reacting 3-ethylenedioxy-Δ⁵-pregnene-11, 21-dione with formaldehyde to form 3-ethylenedioxy-20-methylene-Δ⁵-pregnene-11, 21-dione, reacting the latter with an alkali metal borohydride to form 3-ethylenedioxy-20-methylene-Δ⁵-pregnene-21-ol-11-one, reacting the latter under acidic conditions to form 20-methylene-Δ⁴-pregnene-21-ol-3, 11-dione, acylating the latter to form 20-methylene-21acyl-oxy-Δ⁴-pregnene-3, 11-dione, simultaneously hydroxylating and saponifying the said product to form 20-hydroxymethyl-Δ⁴-pregnene-20, 21-diol-3, 11-dione and recovering the latter.

21. A process for the preparation of 20-methylene-Δ⁴-pregnene-3,11,21-trione which comprises reacting 3-ethylenedioxy-Δ⁵-pregnene-11, 21-dione with formaldehyde to form 3-ethylenedioxy-20-methylene-Δ⁵-pregnene-11, 21-dione, reacting the latter under acidic conditions to form 20-methylene-Δ⁴-pregnene-3,11,21-trione and recovering the latter.

22. A process for the preparation of 20-hydroxymethyl-Δ⁴-pregnene-21-ol-3, 11-dione and 20-bis-(hydroxymethyl)-Δ⁴-pregnene-21-ol-3, 11-dione which comprises subjecting 3-ethylenedioxy-Δ⁵-pregnene-11, 21-dione to reaction with formaldehyde saturated with calcium hydroxide to form a mixture of 3-ethylenedioxy-20-hydroxymethyl-Δ⁵-pregnene-21-ol-11-one and 3-ethylenedioxy-20-bis-(hydroxymethyl)-Δ⁵-pregnene-21-ol-11-one, reacting the mixture under acidic conditions to form a mixture of 20-hydroxymethyl-Δ⁴-pregnene-21-ol-3, 11-dione and 20-bis-(hydroxymethyl)-Δ⁴-pregnene-21-ol-3, 11-dione separating the mixture into its two components by chromatography and recovering said products.

23. A compound having the formula

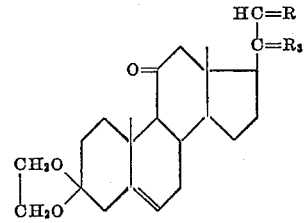

wherein R is selected from the group consisting of

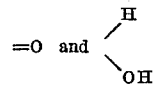

and R₃ is selected from the group consisting of

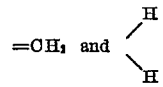

24. A compound having the formula

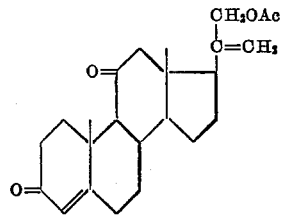

wherein Ac is selected from the group consisting of hydrogen and acetyl.

No references cited.